United States Patent
Funabiki et al.

(10) Patent No.: US 12,427,751 B2
(45) Date of Patent: Sep. 30, 2025

(54) LAMINATED GLASS

(71) Applicant: Nippon Electric Glass Co., Ltd., Shiga (JP)

(72) Inventors: Nobuo Funabiki, Shiga (JP); Takehiko Isomoto, Shiga (JP); Yoshio Tanaka, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 769 days.

(21) Appl. No.: 17/618,209

(22) PCT Filed: Jun. 4, 2020

(86) PCT No.: PCT/JP2020/022174
§ 371 (c)(1),
(2) Date: Dec. 10, 2021

(87) PCT Pub. No.: WO2020/261925
PCT Pub. Date: Dec. 30, 2020

(65) Prior Publication Data
US 2022/0250358 A1  Aug. 11, 2022

(30) Foreign Application Priority Data
Jun. 26, 2019  (JP) .................................. 2019-118302

(51) Int. Cl.
*B32B 15/04* (2006.01)
*B32B 7/023* (2019.01)
(Continued)

(52) U.S. Cl.
CPC .......... *B32B 17/1044* (2013.01); *B32B 7/023* (2019.01); *B32B 17/10036* (2013.01);
(Continued)

(58) Field of Classification Search
CPC ................................................ B32B 17/10036
(Continued)

(56) References Cited

U.S. PATENT DOCUMENTS

2013/0302580 A1* 11/2013 Tomida ............. B32B 17/10036
156/99
2015/0192715 A1  7/2015 Taguchi et al.
(Continued)

FOREIGN PATENT DOCUMENTS

CN   104620144   5/2015
JP   2011-195417  10/2011
(Continued)

OTHER PUBLICATIONS

Office Action issued Nov. 24, 2022 in corresponding Chinese Patent Application No. 202080046230.5, with English-language translation of Search Report.
(Continued)

*Primary Examiner* — Lauren R Colgan
(74) *Attorney, Agent, or Firm* — WENDEROTH, LIND & PONACK, L.L.P.

(57) ABSTRACT

A laminated glass 1 includes a resin plate 2 as a core material, a first glass sheet 4 disposed on one surface side of the resin plate 2 via a first adhesive layer 3, and a second glass sheet 6 disposed on the other surface side of the resin plate 2 via a second adhesive layer 5. A heat reflective film 7 is disposed in the first adhesive layer 3, and a heat absorbing film 8 is disposed in the second adhesive layer 5, the heat absorbing film 8 functioning as a light absorbing member capable of absorbing a portion of incident light. The heat reflective film 7 is disposed closer to the first glass sheet 4 than the heat absorbing film 8 is.

6 Claims, 3 Drawing Sheets

(51) Int. Cl.
*B32B 17/06* (2006.01)
*B32B 17/10* (2006.01)

(52) U.S. Cl.
CPC ... *B32B 17/10174* (2013.01); *B32B 17/10568* (2013.01); *B32B 2250/05* (2013.01); *B32B 2307/304* (2013.01); *B32B 2307/416* (2013.01); *B32B 2307/7376* (2023.05)

(58) Field of Classification Search
USPC .................................................. 428/428, 432
See application file for complete search history.

(56) References Cited

U.S. PATENT DOCUMENTS

| | | | |
|---|---|---|---|
| 2017/0050415 A1* | 2/2017 | Kanki | B32B 17/10633 |
| 2017/0326843 A1* | 11/2017 | Noda | B32B 17/10752 |
| 2019/0101674 A1 | 4/2019 | Machida et al. | |
| 2019/0263227 A1* | 8/2019 | Noda | B32B 17/10752 |

FOREIGN PATENT DOCUMENTS

| | | |
|---|---|---|
| JP | 2014-194446 | 10/2014 |
| JP | 2015-024929 | 2/2015 |
| JP | 2016-117191 | 6/2016 |
| JP | 2018-076189 | 5/2018 |
| TW | 201806865 | 3/2018 |
| WO | 2012/099124 | 7/2012 |

OTHER PUBLICATIONS

International Preliminary Report on Patentability and Written Opinion of the International Searching Authority issued Dec. 28, 2021 in International (PCT) Application No. PCT/JP2020/022174.
International Search Report issued Sep. 1, 2020 in International (PCT) Application No. PCT/JP2020/022174.
Office Action issued Oct. 23, 2024 in corresponding Taiwanese Patent Application No. 113112570, with English-language translation of the search report.

* cited by examiner

FIG. 5

LAMINATED GLASS

TECHNICAL FIELD

The present invention relates to a laminated glass.

BACKGROUND ART

For safety and a lighter weight of a window glass for a building and a vehicle, in place of a single-layer plate glass, a laminated glass having a glass sheet disposed via an adhesive layer on each of both surfaces of its core material, which includes a resin plate, may be used (for example, refer to Patent Documents 1 and 2).

Patent Document 2 describes that, to improve the heat shielding performance of a laminated glass of this type, a heat reflective film, in which an infrared ray-reflecting film is formed on a substrate, is disposed in an adhesive layer.

PRIOR ART DOCUMENTS

Patent Documents

Patent Document 1: JP 2018-76189 A
Patent Document 2: JP 2016-117191 A

SUMMARY OF INVENTION

Technical Problem

A heat reflective film has high reflectivity. When a laminated glass containing a heat reflective film is used for a window glass of a high-rise building or a vehicle, the window glass tends to glare. As a result, there is a problem that the interior of a room or a vehicle is easily reflected as background reflections on the window glass. The problem may cause a user to feel discomfort.

Thus, an object of the present invention is to provide a laminated glass with which the background reflections are reduced while heat shielding performance is improved.

Solution to Problem

The present invention, which was conceived of in order to solve the problems described above, provides a laminated glass including a core material containing a resin plate, a first glass sheet disposed on one surface side of the core material via a first adhesive layer, and a second glass sheet disposed on the other surface side of the core material via a second adhesive layer, the laminated glass further including: a heat reflective film disposed either in the first adhesive layer or in the second adhesive layer; and a light absorbing member capable of absorbing a portion of incident light, wherein the heat reflective film is disposed closer to the first glass sheet than the light absorbing member is.

With such a structure, a portion of the light that is incident on the first glass sheet side (facing outdoors or outside the vehicle) is reflected by the heat reflective film, and therefore the heat shielding performance can be improved. In addition, a portion of the light that is incident on the second glass sheet side (facing indoors or inside a vehicle) is absorbed by the light absorbing member, and therefore the reflectivity at the second glass sheet side can be reduced, and background reflections can be suppressed.

In the structure described above, the resin plate may be a light absorbing member.

Thus, the structure of the laminated glass can be simplified, and the thickness of the laminated glass can be reduced.

Alternatively, the light absorbing member may be a light absorbing film disposed either in the first adhesive layer or in the second adhesive layer.

In this case, the performance of the light absorbing film in terms of absorbing a portion of the incident light is superior to that of a resin plate that can absorb a portion of the incident light, and thus, background reflections can be further suppressed.

For a structure in which the light absorbing film described above is used, the light absorbing film is preferably a heat absorbing film.

Through this, the laminate glass can considerably absorb heat rays of the light that is incident on the side of the first glass sheet (facing outdoors or outside of a vehicle) and transmitted through the heat reflective film. Therefore, heat shielding performance can be further improved. In addition, even the heat absorbing film can absorb a portion of the light that is incident on the side of the second glass sheet (facing indoors or inside a vehicle). Therefore, the reflectivity at the side of the second glass sheet can be reduced, and background reflections can be suppressed.

For a structure in which the light absorbing film described above is used, preferably, the heat reflective film is disposed in the first adhesive layer, and the light absorbing film is disposed in the second adhesive layer.

When the laminated glass is structured in this manner, the heat reflective film and the light absorbing film are disposed in a well-balanced manner on both sides of the core material. Therefore, the occurrence of warpage in the laminated glass can be suppressed even in a case where heat is applied in the process of manufacturing the laminated glass or in a case in which the temperature of the usage environment fluctuates.

In the structure described above, preferably, the heat reflective film includes a first substrate and a reflective film formed on the first substrate, and the reflective film is disposed closer to the core material than the first substrate is.

There is typically a difference in thermal expansion coefficients between a glass sheet and a core material containing a resin. The laminated glass expands and contracts in association with the changes in temperature, in a case where, for example, heat is applied in the process of manufacturing the laminated glass. Therefore, a difference in the magnitude of thermal deformation may arise in the glass sheet and the other portions, causing to generate a large stress (e.g., shear stress) in the vicinity of the glass sheet. As a result, when the reflective film is disposed closer to the first glass sheet than the first substrate is, the stress that acts in the vicinity of the first glass sheet may cause the separation of the reflective film from the first substrate, which is a problem. In contrast, when the reflective film is disposed closer to the core material than the first substrate is, as in the structure described above, the first substrate is disposed between the reflective film and the first glass sheet. Therefore, the stress acting in the vicinity of the first glass sheet does not readily affect the reflective film directly, and the separation of the reflective film can be suppressed.

In the structure described above, the thickness of the first adhesive layer between the heat reflective film and the first glass sheet is preferably larger than the thickness of the first adhesive layer between the heat reflective film and the core material.

When the laminated glass is structured in this manner, the difference in the thicknesses of the first adhesive layers on both sides of the heat reflective film can position the reflective film at a greater distance from the first glass sheet.

Accordingly, even if a large stress is applied in the vicinity of the first glass sheet, such as in a case where heat is applied in the process of manufacturing the laminated glass, the stress does not readily affect the reflective film directly, and the separation of the reflective film can be further suppressed.

In this case, the thickness of the first adhesive layer between the heat reflective film and the first glass sheet is preferably 0.3 mm or larger.

In the structure described above, preferably, the light absorbing film includes a second substrate and an absorbing film formed on the second substrate, and the absorbing film is preferably disposed closer to the core material than the second substrate is.

Similar to the case of the reflective film described above, when the absorbing film is disposed closer to the second glass sheet than the second substrate is, stress that acts in the vicinity of the second glass sheet, such as in a case where heat is applied in the process of manufacturing the laminated glass, may cause the separation of the absorbing film from the second substrate, which is a problem. In contrast, when the absorbing film is disposed closer to the core material than the second substrate is, as in the structure described above, the second substrate is disposed between the absorbing film and the second glass sheet. Therefore, the stress acting in the vicinity of the second glass sheet does not readily affect the absorbing film directly, and the separation of the absorbing film can be suppressed.

In the structure described above, the thickness of the second adhesive layer between the light absorbing film and the second glass sheet is preferably larger than the thickness of the second adhesive layer between the light absorbing film and the core material.

When the laminated glass is structured in this manner, the difference in the thicknesses of the second adhesive layers on both sides of the light absorbing film can position the absorbing film at a greater distance from the second glass sheet. Accordingly, even if a large stress is applied in the vicinity of the second glass sheet, such as in a case where heat is applied in the process of manufacturing the laminated glass, the stress does not readily affect the absorbing film directly, and the separation of the absorbing film can be further suppressed.

In this case, the thickness of the adhesive layer between the light absorbing film and the second glass sheet is preferably 0.3 mm or larger.

Advantageous Effects of Invention

According to the present invention, a laminated glass having the reduced background reflections while improving the heat-shielding performance can be provided.

DESCRIPTION OF EMBODIMENTS

Embodiments of the present invention will be described below with reference to the accompanying drawings. Note that in the second and subsequent embodiments, constituent elements that are the same as those of other embodiments are assigned the same reference numerals, and detailed descriptions thereof are omitted.

First Embodiment

Figure 1:
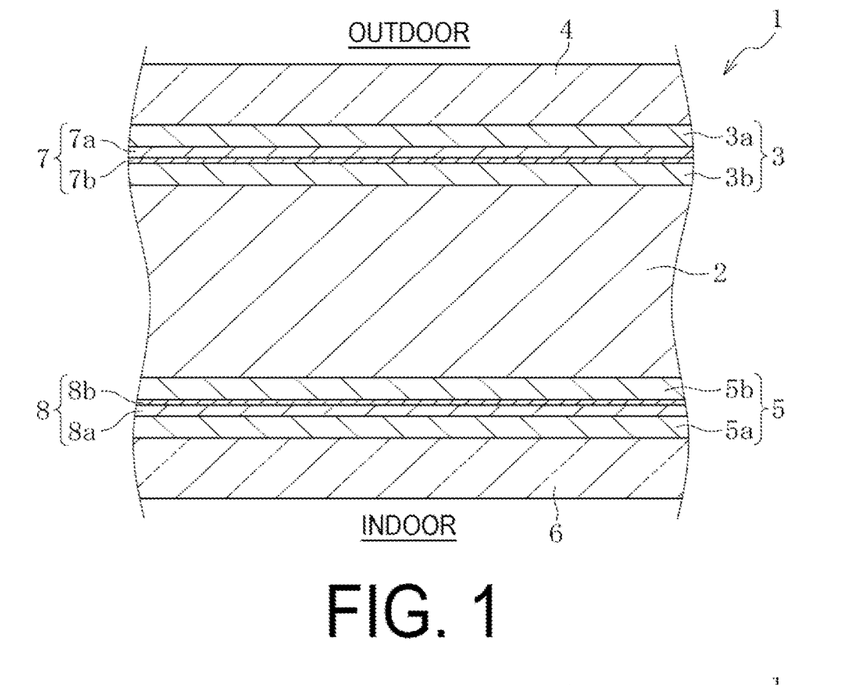
FIG. 1 is a cross-sectional view illustrating a laminated glass according to a first embodiment.

As illustrated in FIG. 1, a laminated glass 1 according to the first embodiment includes a resin plate 2 as a core material, a first glass sheet 4 disposed on one surface side of the resin plate 2 via a first adhesive layer 3, and a second glass sheet 6 disposed on the other surface side of the resin plate 2 via a second adhesive layer 5. In the present embodiment, additionally, a heat reflective film 7 is disposed in the first adhesive layer 3, and a heat absorbing film 8 (light absorbing member) is disposed in the second adhesive layer 5.

The resin plate 2, the first glass sheet 4, the second glass sheet 6, the heat reflective film 7, and the heat absorbing film 8 are laminated, and integrated as one single object through the first adhesive layer 3 and the second adhesive layer 5.

The laminated glass 1 can be used, for example, in a window glass of a building or vehicle. Examples of buildings include regular residential housings, commercial facilities, public facilities, and high-rise buildings. Examples of vehicles include automobiles, railway vehicles, and aircraft. In the present embodiment, the laminated glass 1 is attached such that the first glass sheet 4 side faces outdoors and the second glass sheet 6 side faces indoors. In other words, the laminated glass 1 is installed such that the heat absorbing film 8 is positioned closer to the indoor side than the heat reflective film 7 is. As a result, the heat absorbing film 8 at the indoor side can reduce reflectivity and suppress background reflections of the interior of the room while the heat reflective film 7 at the outdoor side improves heat shielding performance. This type of laminated glass 1 is suitable for window glass for which a shielding member such as a curtain or a blind is not installed indoors. For example, in the case of a vehicle, this type of laminated glass 1 is suitable for a windshield, side glass, rear glass, and door window glass. In the case of a building, the laminated glass 1 is suitable for window glass of a large opening, for example. In the present specification, the term "outdoors" is used in the sense that includes not only the outside of a building but also the exterior of a vehicle, and the term "indoors" is used in a sense that includes not only inside a building but also the inside a vehicle.

The resin plate 2 can be a colorless, transparent resin. Furthermore, color can be imparted to the laminated glass 1 by changing the resin plate 2 to a colored, transparent resin. In this case, background reflections of the interior of the room can be further suppressed.

The resin plate 2 may be changed to a resin having a heat shielding property, an ultraviolet light shielding property, electromagnetic wave shielding property, or electrical conductivity, or to a resin having a matte finish.

Examples of materials that can be employed for the resin plate 2 include polycarbonate, acrylic, polyethylene terephthalate (PET), polypropylene (PP), urethane resin, vinyl chloride resin, or a cycloolefin polymer (COP). Polycarbonate, acrylic, and PET are widely available and inexpensive, and excel in visible light transmittance, and therefore are preferably employed.

In the present embodiment, the core material includes only a single resin plate 2, but the core material may be, for example, a laminate of a plurality of resin plates, which is laminated through adhesive layers. In this case, the plurality of resin plates may include materials of the same type, or may include different materials.

A thickness of each of the first glass sheet 4 and the second glass sheet 6 is smaller than a thickness of the resin plate 2 (core material). Such a structure can reduce a proportion of the glass sheets 4 and 6 accounting for the laminated glass 1, and therefore achieve a lighter weight.

A total thickness of the first glass sheet 4 and the second glass sheet 6 is preferably 1/5 or less, more preferably 1/7 or less, and most preferably 1/10 or less, of the thickness of the resin plate 2.

Specifically, the thickness of each of the first glass sheet 4 and the second glass sheet 6 is preferably 2 mm or smaller, more preferably 1.5 mm or smaller, and most preferably 1.3 mm or smaller. On the other hand, from the perspective of further improvement on the strength, the thickness of each of the first glass sheet 4 and the second glass sheet 6 are preferably 0.05 mm or larger, more preferably 0.1 mm or larger, and most preferably 0.15 mm or larger. Note that in the present embodiment, the thicknesses of the first glass sheet 4 and the second glass sheet 6 are the same, but may be different from each other.

The first glass sheet 4 and the second glass sheet 6 can be, for example, silicate glass, silica glass, borosilicate glass, soda lime glass, aluminosilicate glass, or an alkali-free glass. A borosilicate glass is preferably employed from the perspective of improvement in the heat resistance and chemical resistance of the laminated glass 1. In addition, from the perspective of reduction in the manufacturing cost of the laminated glass 1, a soda lime glass, which is widely available and inexpensive, is preferably employed. From the perspective of improvement in the heat resistance and strength of the laminated glass 1, an aluminosilicate glass is preferably employed. Further, from the perspective of improvement in the transparency, weather resistance, and chemical resistance of the laminated glass 1, it is most preferable to employ alkali-free glass. Note that tempered glass may be employed for the first glass sheet 4 and the second glass sheet 6.

A glass sheet formed by, for example, a downdraw process or a float glass process can be used for the first glass sheet 4 and the second glass sheet 6. Here, examples of the downdraw process include an overflow downdraw process, a slot downdraw process, and a redraw process. A glass sheet formed by the overflow downdraw process, that is, a glass sheet in which the surfaces of both sides are fire-polished surfaces is preferably used because of its high surface quality.

The material for the first adhesive layer 3 and the second adhesive layer 5 is not particularly limited. Examples of the adhesive layers include an adhesive layer in which a double-sided pressure-sensitive adhesive sheet, a thermoplastic adhesive sheet, a thermally crosslinkable adhesive sheet, or an energy curable liquid adhesive is used. For example, the adhesive layers may each be an adhesive layer in which an optical clear adhesive sheet (OCA), an ethylene-vinyl acetate copolymer resin (EVA), a thermoplastic polyurethane (TPU), an acrylic thermoplastic adhesive sheet, a UV curable adhesive, a thermosetting adhesive, or an ordinary temperature-curable adhesive is used.

The first adhesive layer 3 and the second adhesive layer 5 preferably have an ultraviolet light shielding property in order to protect the resin plate 2 from ultraviolet light (for example, ultraviolet light in sunlight) originating from the external environment. When an adhesive containing an ultraviolet absorber is employed, an ultraviolet light shielding property can be imparted to the first adhesive layer 3 and the second adhesive layer 5. In this case, from the perspective of improvement in adhesiveness and weather resistance, a hot melt adhesive containing an ultraviolet absorber is more preferably employed.

The first adhesive layer 3 includes a first portion 3a provided between the first glass sheet 4 and the heat reflective film 7, and a second portion 3b provided between the heat reflective film 7 and the resin plate 2. In the present embodiment, the thicknesses of the first portion 3a and the second portion 3b of the first adhesive layer 3 are mutually the same. In other words, the heat reflective film 7 is disposed at the center of the first adhesive layer 3 in the thickness direction. Note that the first portion 3a and the second portion 3b may be made of a material of the same kind or a different kind.

The second adhesive layer 5 includes a first portion 5a provided between the second glass sheet 6 and the heat absorbing film 8, and a second portion 5b provided between the heat absorbing film 8 and the resin plate 2. In the present embodiment, the thicknesses of the first portion 5a and the second portion 5b of the second adhesive layer 5 are mutually the same. In other words, the heat absorbing film 8 is disposed at the center of the second adhesive layer 5 in the thickness direction. Note that the first portion 5a and the second portion 5b may be made of a material of the same kind or a different kind.

The suitable thickness of each of the first adhesive layer 3 and the second adhesive layer 5 (a total thickness of the first portion 3a and the second portion 3b, and a total thickness of the first portion 5a and the second portion 5b) may depend on factors such as the dimensions (length and width) of the laminated glass 1 and the thickness of each of the components. However, from the perspective that the first adhesive layer 3 and the second adhesive layer 5 absorb warpage of the laminated glass 1 caused by a difference in thermal expansion coefficients, the thickness of each of the first adhesive layer 3 and the second adhesive layer 5 is preferably 0.1 mm or larger, more preferably 0.2 mm or larger, and most preferably 0.4 mm or larger. On the other hand, when the thickness of each of the first adhesive layer 3 and the second adhesive layer 5 is large, the transmittance of visible light decreases. Therefore, the thickness of each of the first adhesive layer 3 and the second adhesive layer 5 is preferably 3 mm or smaller, more preferably 2 mm or smaller, and most preferably 1 mm or smaller.

The heat reflective film 7 is transparent and includes a first substrate 7a and a reflective film 7b formed on the first substrate 7a. A resin film of a resin such as polyester, olefin, or polypropylene can be used for the first substrate 7a. Paper formed from pulp or the like can also be used for the first substrate 7a. A metal film of a metal such as Au, Ag, Al, Cu, Cr, $TiO_2$, $Ta_2O_5$, $Al_2O_3$, $SiO_2$, or $MgF_2$ can be used as the reflective film 7b.

The heat absorbing film 8 is transparent and includes a second substrate 8a and an absorbing film 8b formed on the second substrate 8a. The materials given as examples for the first substrate 7a can be similarly used for the second substrate 8a. Examples of materials that can be employed for the absorbing film 8b include ITO, ATO, tungsten-based complex oxides, lanthanum hexaboride, cesium tungstate, cyanine compounds, phthalocyanine compounds, dithiol metal complexes, naphthoquinone compounds, diimmonium compounds, and azo compounds.

In the present embodiment, the reflective film 7b is disposed closer to the resin plate 2 than the first substrate 7a is, and the absorbing film 8b is disposed closer to the resin plate 2 than the second substrate 8a is. In other words, the first substrate 7a is provided between the reflective film 7b and the first glass sheet 4, and the second substrate 8a is provided between the absorbing film 8b and the second glass sheet 6. Through this, the separation of the reflective film 7b and the absorbing film 8b can be suppressed. This is because in cases where heat is applied in a heat treatment (for example, when various components are laminated with an adhesive layer made from a hot melt adhesive) included in a process of manufacturing the laminated glass 1, or in cases where the temperature of the usage environment varies, even if the temperature of the laminated glass 1 varies and a large stress is applied near in the vicinity of the first glass sheet 4 or near the second glass sheet 6, the stress does not readily affect the reflective film 7b or the absorbing film 8b directly.

Note that in the heat reflective film 7 and the heat absorbing film 8, in cases where the separation of the reflective film 7b and the absorbing film 8b is not a problem, the orientation of these films is not particularly limited. In other words, the reflective film 7b may be disposed closer to the first glass sheet 4 than the first substrate 7a is, or the absorbing film 8b may be disposed closer to the second glass sheet 6 than the second substrate 8a is.

The thickness of each of the heat reflective film 7 and the heat absorbing film 8 is not particularly limited, but is preferably from 0.01 mm to 0.5 mm, more preferably from 0.02 mm to 0.25 mm, and most preferably from 0.05 mm to 0.15 mm.

The laminated glass 1 provided with the structure described above preferably has the following characteristics. That is, the visible light transmittance is preferably from 15% to 90%, and more preferably from 30% to 90%. Visible light reflectivity on the first glass sheet 4 side (facing outdoor) is preferably from 8% to 50%, and more preferably from 8% to 30%. The visible light reflectivity on the second glass sheet 6 side (facing indoor) is preferably from 8% to 40%, and more preferably from 8% to 20%. The solar heat gain coefficient is preferably from 0.1 to 0.7, and more preferably from 0.1 to 0.5. Here, the visible light transmittance, visible light reflectivity, and solar heat gain coefficient are values calculated in accordance with JIS R 3106:1998.

Second Embodiment

Figure 2:
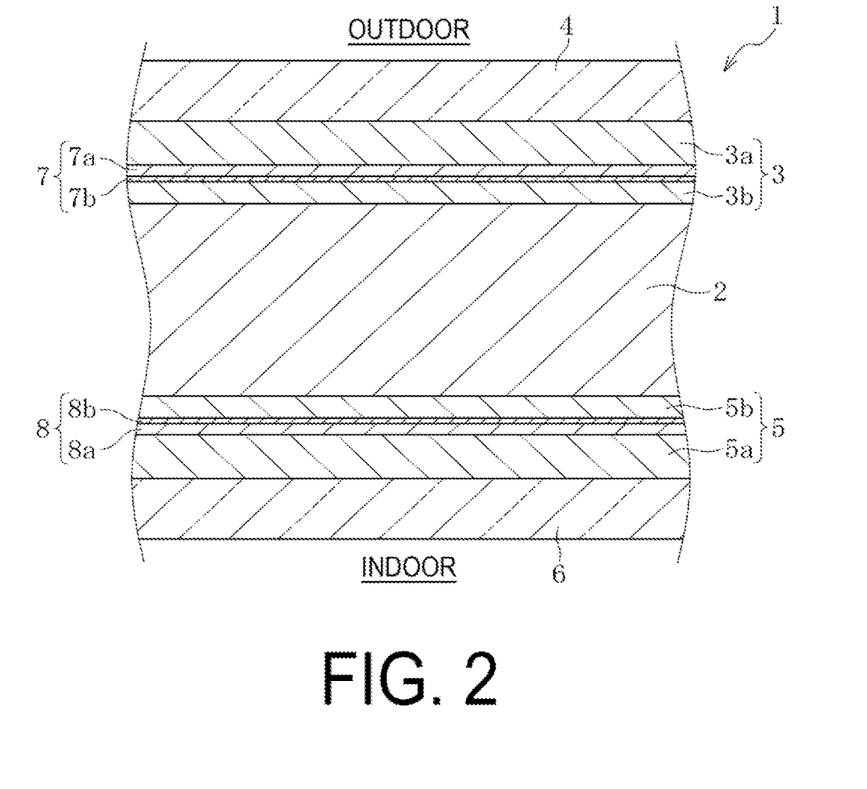
FIG. 2 is a cross-sectional view illustrating a laminated glass according to a second embodiment.

As illustrated in FIG. 2, a laminated glass 1 according to a second embodiment differs from the laminated glass 1 according to the first embodiment on primarily two points.

The first difference is that the thickness of the first portion 3a of the first adhesive layer 3 provided between the first glass sheet 4 and the heat reflective film 7 is larger than the thickness of the second portion 3b of the first adhesive layer 3 provided between the heat reflective film 7 and the resin plate 2. When the laminated glass 1 is structured in this manner, the reflective film 7b is disposed offset to the resin plate 2 side due to the difference in thicknesses between the first portion 3a and the second portion 3b of the first adhesive layer 3. The reflective film 7b can be maintained at a distance from the first glass sheet 4. Accordingly, even if a large stress is applied in the vicinity of the first glass sheet 4 such as in a case where heat is applied in the process of manufacturing the laminated glass 1, the stress does not readily affect the reflective film 7b directly, and the separation of the reflective film 7b can be suppressed.

The second difference is that the thickness of the first portion 5a of the second adhesive layer 5 provided between the second glass sheet 6 and the heat absorbing film 8 is larger than the thickness of the second portion 5b of the second adhesive layer 5 provided between the heat absorbing film 8 and the resin plate 2. When the laminated glass 1 is structured in this manner, the absorbing film 8b is disposed offset to the resin plate 2 side due to the difference in thicknesses between the first portion 5a and the second portion 5b of the second adhesive layer 5. The absorbing film 8b can be maintained at a distance from the second glass sheet 6. Accordingly, even if a large stress is applied in the vicinity of the second glass sheet 6 such as in a case where heat is applied in the process of manufacturing the laminated glass 1, the stress does not readily affect the absorbing film 8b directly, and the separation of the absorbing film 8b can be suppressed.

When the thickness of the first portion 3a of the first adhesive layer 3 is larger than the thickness of the second portion 3b of the first adhesive layer 3, the thickness of the first portion 3a is preferably from 1.5 to 3 times the thickness of the second portion 3b. Similarly, when the thickness of the first portion 5a of the second adhesive layer 5 is larger than the thickness of the second portion 5b of the second adhesive layer 5, the thickness of the first portion 5a is preferably from 1.5 to 3 times the thickness of the second portion 5b.

Specifically, the thickness of the first portion 3a of the first adhesive layer 3 and the thickness of the first portion 5a of the second adhesive layer 5 are each preferably from 0.3 mm to 2 mm. Moreover, the thickness of the second portion 3b of the first adhesive layer 3 and the thickness of the second portion 5b of the second adhesive layer 5 are each preferably from 0.05 mm to 1 mm, and more preferably from 0.05 mm to 0.3 mm.

Note that when the difference in thicknesses described above is provided between the first portion 3a and the second portion 3b of the first adhesive layer 3, the separation of the reflective film 7b can be suppressed even if the reflective film 7b is disposed closer to the first glass sheet 4 than the first substrate 7a is. Accordingly, the reflective film 7b may be disposed closer to the first glass sheet 4 than the first substrate 7a is. However, from the perspective of further suppression of the separation of the reflective film 7b, the reflective film 7b is preferably disposed closer to the resin plate 2 than the first substrate 7a is, as illustrated in FIG. 2.

Likewise, when the difference in thicknesses described above is provided between the first portion 5a and the second portion 5b of the second adhesive layer 5, the separation of the absorbing film 8b can be suppressed even if the absorbing film 8b is disposed closer to the second glass sheet 6 than the second substrate 8a is. Accordingly, the absorbing film 8b may be disposed closer to the second glass sheet 6 than the second substrate 8a is. However, from the perspective of further suppression of the separation of the absorbing film 8b, the absorbing film 8b is preferably disposed closer to the resin plate 2 than the second substrate 8a is, as illustrated in FIG. 2.

Note that from the perspective of suppressing warpage of the laminated glass 1 by adopting a symmetric structure, it is preferable that the thickness of the first portion 3a of the first adhesive layer 3 be approximately the same as the thickness of the first portion 5a of the second adhesive layer 5, and that the thickness of the second portion 3b of the first adhesive layer 3 be approximately the same as the thickness of the second portion 5b of the second adhesive layer 5. For example, preferably, the thickness of the first portion 3a of the first adhesive layer 3 is from 0.75 to 1.25 times the thickness of the first portion 5a of the second adhesive layer 5, and the thickness of the second portion 3b of the first adhesive layer 3 is from 0.75 to 1.25 times the thickness of the second portion 5b of the second adhesive layer 5.

Third Embodiment

Figure 3:
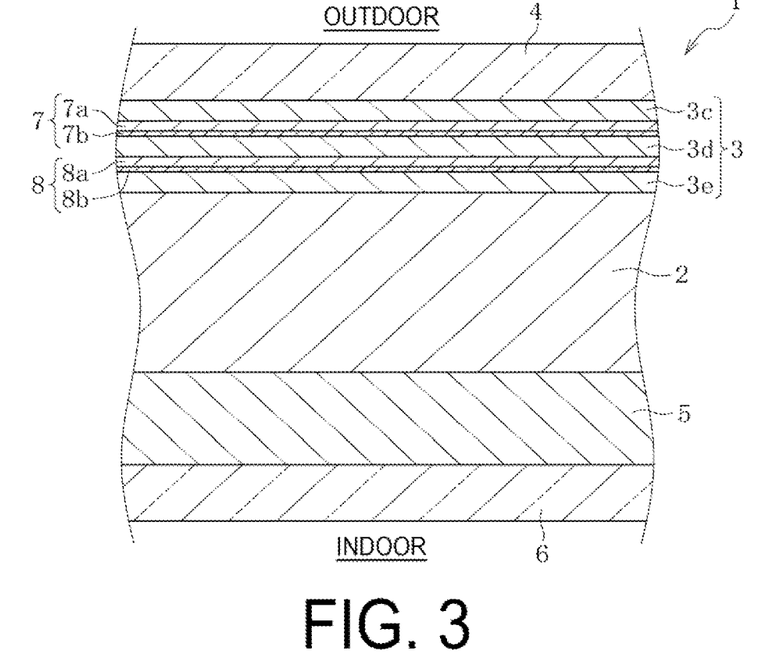
FIG. 3 is a cross-sectional view illustrating a laminated glass according to a third embodiment.

As illustrated in FIG. 3, a laminated glass 1 according to a third embodiment differs from the laminated glass 1 according to the first embodiment in that the heat reflective film 7 and the heat absorbing film 8 are both disposed in the first adhesive layer 3. Note that the heat reflective film 7 and the heat absorbing film 8 are not disposed in the second adhesive layer 5.

In the first adhesive layer 3, the heat absorbing film 8 is disposed closer to the resin plate 2 than the heat reflective film 7 is. In other words, the structure is such that the heat absorbing film 8 is positioned closer to the indoor side than the heat reflective film 7 is.

The first adhesive layer 3 includes a first portion 3c provided between the first glass sheet 4 and the heat reflective film 7, a second portion 3d provided between the heat reflective film 7 and the heat absorbing film 8, and a third portion 3e provided between the heat absorbing film 8 and the resin plate 2.

Figure 4:
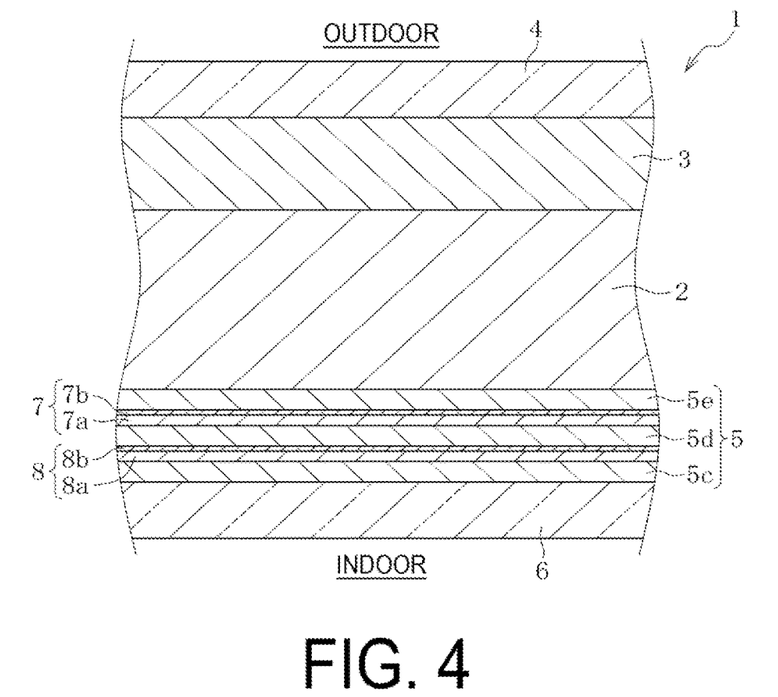
FIG. 4 is a cross-sectional view illustrating a laminated glass according to a modified example of the third embodiment.

Note that, as illustrated in FIG. 4, the heat reflective film 7 and the heat absorbing film 8 may be disposed in the second adhesive layer 5 instead of the first adhesive layer 3. In this case, in the second adhesive layer 5, the heat absorbing film 8 is disposed closer to the second glass sheet 6 than the heat reflective film 7 is. In other words, the heat absorbing film 8 is closer to the indoor side than the heat reflective film 7 is. Note that when the heat reflective film 7 and the heat absorbing film 8 are disposed in the first adhesive layer 3, heat rays from the outside are promptly reflected back to the outside, and absorption of the heat rays in the laminated glass 1 is suppressed, and thus heat shielding performance is improved. Accordingly, a case the heat reflective film 7 and the heat absorbing film 8 are disposed in the first adhesive layer 3 is preferable compared to a case where the heat reflective film 7 and the heat absorbing film 8 are disposed in the second adhesive layer 5.

Fourth Embodiment

Figure 5:
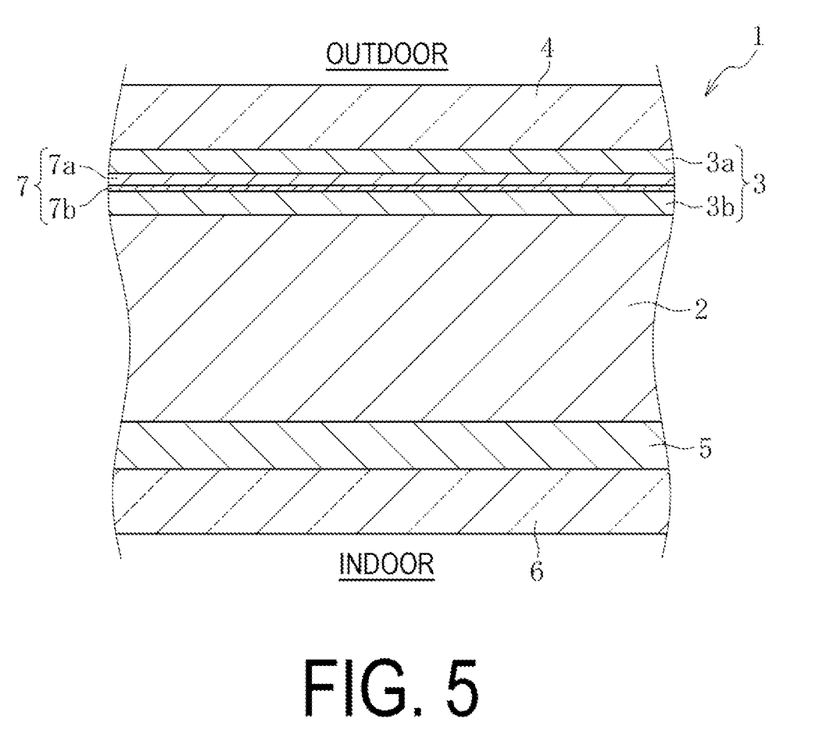
FIG. 5 is a cross-sectional view illustrating a laminated glass according to a fourth embodiment.

As illustrated in FIG. 5, a laminated glass 1 according to a fourth embodiment differs from the laminated glass 1 according to the first embodiment in that the resin plate 2 is a light absorbing member and the heat absorbing film 8 is not employed. This resin plate 2 is formed from a material capable of absorbing heat rays (for example, a heat absorbing polycarbonate). In this case, the solar absorptivity of the resin plate 2 can be set from 20 to 70%, for example.

EXAMPLES

Hereinafter, the laminated glass of the present invention will be described in detail on the basis of examples, but the present invention is not limited to these examples.

First, the visible light transmittance, the visible light reflectivity at the outdoor side, the visible light reflectivity at the indoor side, the solar heat gain coefficient during the summer season, and the solar heat gain coefficient during the winter season were measured for the laminated glass according to Example 1 and Comparative Examples 1 and 2 described below. Each value was measured in accordance with JIS R 3106:1998. Also, the outer dimensions of the laminated glass were set to 300 mm×300 mm when measuring each of the values. The measurement results are shown in Table 4.

Example 1

In Example 1, a laminated glass having a structure similar to that of the laminated glass 1 illustrated in FIG. 1 was fabricated. The contents of each component of the fabricated laminated glass is shown in Table 1.

TABLE 1

| | | Materials and Characteristics | Thickness [mm] |
|---|---|---|---|
| First glass sheet | | Alkali-free glass | 0.5 |
| First portion of first adhesive layer | | Hot melt EVA-based adhesive | 0.2 |
| Heat reflective film | First substrate | Polyester | 0.1 |
| | Reflective film | Metal film | <0.01 |
| Second portion of first adhesive layer | | Hot melt EVA-based adhesive | 0.2 |
| Resin plate (core material) | | Colorless, transparent polycarbonate | 5.0 |
| Second portion of second adhesive layer | | Hot melt EVA-based adhesive | 0.2 |
| Heat absorbing film | Absorbing film | ITO film | <0.01 |
| | Second substrate | Polyester | 0.1 |
| First portion of second adhesive layer | | Hot melt EVA-based adhesive | 0.2 |
| Second Glass Sheet | | Alkali-free glass | 0.5 |

Comparative Example 1

In Comparative Example 1, a laminated glass was fabricated with a structure in which the heat reflective film and the heat absorbing film were omitted from the laminated glass illustrated in FIG. 1. The contents of each component of the laminated glass is shown in Table 2.

TABLE 2

| | Materials and Characteristics | Thickness [mm] |
|---|---|---|
| First glass sheet | Alkali-free glass | 0.5 |
| First adhesive layer | Hot melt EVA-based adhesive | 0.4 |
| Resin plate (core material) | Colorless transparent polycarbonate | 5.0 |
| Second adhesive layer | Hot melt EVA-based adhesive | 0.4 |
| Second glass sheet | Alkali-free glass | 0.5 |

Comparative Example 2

In Comparative Example 2, a laminated glass was fabricated with a structure in which the heat absorbing film was omitted from the laminated glass illustrated in FIG. 1. The contents of each component of the laminated glass is shown in Table 3.

TABLE 3

|  | Materials and Characteristics |  | Thickness [mm] |
| --- | --- | --- | --- |
| First glass sheet | Alkali-free glass |  | 0.5 |
| First portion of first adhesive layer | Hot melt EVA-based adhesive |  | 0.2 |
| Heat reflective film | Substrate | Polyester | 0.1 |
|  | Reflective film | Metal film | <0.01 |
| Second portion of first adhesive layer | Hot melt EVA-based adhesive |  | 0.2 |
| Resin plate (core material) | Colorless transparent polycarbonate |  | 5.0 |
| Second adhesive layer | Hot melt EVA-based adhesive |  | 0.4 |
| Second glass sheet | Alkali-free glass |  | 0.5 |

TABLE 4

|  | Example 1 | Comparative Example 1 | Comparative Example 2 |
| --- | --- | --- | --- |
| Visible light transmittance | 32% | 85% | 40% |
| Visible light reflectivity (outdoor/indoor) | 44%/26% | 8%/8% | 45%/44% |
| Solar heat gain coefficient (summer/winter) | 0.22/0.20 | 0.85/0.84 | 0.27/0.26 |

From the results shown in Table 4, with regard to Comparative Example 2 having a structure in which only a heat reflective film was added to the structure of Comparative Example 1, it can be confirmed that, compared to Comparative Example 1, the solar heat gain coefficient was reduced, while both the outdoor and indoor side visible light reflectivity were significantly increased. From this, it can be understood that with Comparative Example 2, the heat shielding performance could be improved, but background reflections of the interior of the room could not be suppressed. In contrast, with regard to Example 1 having a structure in which a heat reflective film and a heat absorbing film were added to the structure of Comparative Example 1, it can be confirmed that the solar heat gain coefficient was reduced compared to Comparative Example 1, and the visible light reflectivity at the indoor side was significantly reduced compared to Comparative Example 2. From this, it can be understood that in Example 1, background reflections of the interior of the room could be suppressed while heat shielding performance was improved.

Next, as to the laminated glass according to Examples 2 to 4, heat cycle tests were performed to examine whether the separation of the reflective film of the heat reflective film and the separation of the absorbing film of the heat absorbing film occurred. The conditions of the heat cycle test included repeating 50 times a cycle of heating from −20° C. to 60° C. followed by reducing the temperature from 60° C. to −20° C. For the examination, the outer dimensions of the laminated glass were set to 300 mm×300 mm, and three samples of each example were prepared. The test results are shown in Table 7.

Example 2

In Example 2, the orientations of the reflective film of the heat reflective film and of the absorbing film of the heat absorbing film were changed from the structure of the laminated glass 1 illustrated in FIG. 1. That is, the thickness of the first portion of the first adhesive layer was set to be the same as the thickness of the second portion of the first adhesive layer, and the thickness of the first portion of the second adhesive layer was set to be the same as the thickness of the second portion of the second adhesive layer. The reflective film was disposed closer to the first glass sheet than the first substrate was, and the adsorbing film was disposed closer to the second glass sheet than the second substrate was. The contents of each component of the fabricated laminated glass is shown in Table 5.

TABLE 5

|  | Materials and Characteristics |  | Thickness [mm] |
| --- | --- | --- | --- |
| First glass sheet | Alkali-free glass |  | 0.5 |
| First portion of first adhesive layer | Hot melt EVA-based adhesive |  | 0.2 |
| Heat reflective film | Reflective film | Metal film | <0.01 |
|  | First substrate | Polyester | 0.1 |
| Second portion of first adhesive layer | Hot melt EVA-based adhesive |  | 0.2 |
| Resin plate (core material) | Colorless, transparent polycarbonate |  | 5.0 |
| Second portion of second adhesive layer | Hot melt EVA-based adhesive |  | 0.2 |
| Heat absorbing film | Second substrate | Polyester | 0.1 |
|  | Absorbing film | ITO film | <0.01 |
| First portion of second adhesive layer | Hot melt EVA-based adhesive |  | 0.2 |
| Second glass sheet | Alkali-free glass |  | 0.5 |

Example 3

In Example 3, a laminated glass having the same structure as the laminated glass 1 of Example 1 (Table 1) was fabricated. That is, the thickness of the first portion of the first adhesive layer was set to be the same as the thickness of the second portion of the first adhesive layer, and the thickness of the first portion of the second adhesive layer was set to be the same as the thickness of the second portion of the second adhesive layer.

Example 4

In Example 4, a laminated glass having a structure similar to that of the laminated glass 1 illustrated in FIG. 2 was fabricated. That is, the thickness of the first portion of the first adhesive layer was set to be larger than the thickness of the second portion of the first adhesive layer, and the thickness of the first portion of the second adhesive layer was set to be larger than the thickness of the second portion of the second adhesive layer. The contents of each component of the fabricated laminated glass is shown in Table 6.

TABLE 6

|  | Materials and Characteristics |  | Thickness [mm] |
| --- | --- | --- | --- |
| First glass sheet | Alkali-free glass |  | 0.5 |
| First portion of first adhesive layer | Hot melt EVA-based adhesive |  | 0.4 |
| Heat reflective film | First substrate | Polyester | 0.1 |
|  | Reflective film | Metal film | <0.01 |
| Second portion of first adhesive layer | Hot melt EVA-based adhesive |  | 0.2 |
| Resin plate (core material) | Colorless, transparent polycarbonate |  | 5.0 |
| Second portion of second adhesive layer | Hot melt EVA-based adhesive |  | 0.2 |
| Heat absorbing film | Absorbing film | ITO film | <0.01 |
|  | Second substrate | Polyester | 0.1 |
| First portion of second adhesive layer | Hot melt EVA-based adhesive |  | 0.4 |
| Second glass sheet | Alkali-free glass |  | 0.5 |

TABLE 7

|  | Example 2 | Example 3 | Example 4 |
|---|---|---|---|
| Number of separated sheets of the reflective film | 2 (out of 3) | None | None |
| Number of separated sheets of the absorbing film | 1 (out of 3) | None | None |

From the results shown in Table 7, it can be confirmed that the separation of the reflective film occurred in Example 2 in which the reflective film was disposed closer to the first glass sheet than the first substrate was. In contrast, in Examples 3 and 4 in which the reflective film was disposed closer to the resin plate than the first substrate was, it can be confirmed that the separation of the reflective film did not occur. In particular, in Example 4 in which the reflective film was maintained at a distance from the first glass sheet due to the thickness difference of the first adhesive layer, it is thought that the effect of suppressing the separation of the reflective film is even higher.

Similarly, in Example 2 in which the absorbing film was disposed closer to the second glass sheet than the second substrate was, it can be confirmed that the separation of the absorbing film occurred. In contrast, in Examples 3 and 4 in which the absorbing film was disposed closer to the resin plate than the second substrate was, it can be confirmed that the separation of the absorbing film did not occur. In particular, in Example 4 in which the absorbing film was maintained at a distance from the second glass sheet due to the thickness difference of the first adhesive layer, it is thought that the effect of suppressing the separation of the absorbing film is even higher.

Next, as with Example 1 and Comparative Examples 1 and 2, the visible light transmittance, the visible light reflectivity at the outdoor side, the visible light reflectivity at the indoor side, the solar heat gain coefficient during the summer season, and the solar heat gain coefficient during the winter season were measured for the laminated glass of Example 5 described below.

Example 5

In Example 5, a laminated glass having a structure similar to that of the laminated glass 1 illustrated in FIG. 5 was fabricated. The contents of each component of the fabricated laminated glass is shown in Table 8. Note that the solar absorptivity of the heat absorbing polycarbonate was 30%.

TABLE 8

|  |  | Materials and Characteristics | Thickness [mm] |
|---|---|---|---|
| First glass sheet |  | Alkali-free glass | 0.5 |
| First portion of first adhesive layer |  | Hot melt EVA-based adhesive | 0.2 |
| Heat reflective film | First substrate | Polyester | 0.1 |
|  | Reflective film | Metal film | <0.01 |
| Second portion of first adhesive layer |  | Hot melt EVA-based adhesive | 0.2 |
| Resin plate (core material) |  | Colorless, transparent at absorbing polycarbonate | 5.0 |
| Second adhesive layer |  | Hot melt EVA-based adhesive | 0.4 |
| Second glass sheet |  | Alkali-free glass | 0.5 |

In Example 5, the visible light transmittance was 35%, the visible light reflectivity (outdoor/indoor) was 44%/29%, and the solar heat gain coefficient (summer/winter) was 0.24/0.23. From this, it can be understood that in Example 5, background reflections of the interior of the room could be suppressed while improving heat shielding performance.

Note that the present invention is not limited to the embodiments described above, and may be further carried out in various forms without departing from the spirit of the present invention.

In the embodiments described above, a plurality of heat reflective films and/or heat absorbing films may be disposed in an adhesive layer. In this case, a plurality of heat reflective films may be disposed in the first adhesive layer, and a plurality of the heat absorbing films may be disposed in the second adhesive layer. In addition, a heat reflective film and a heat absorbing film may be disposed in both the first adhesive layer and the second adhesive layer. However, from the perspective of suppression of background reflections, it is preferable to dispose at least one heat absorbing film closer to the second glass sheet than the heat reflective film located closest to second glass sheet side (indoor side).

In the embodiments described above, a functional film besides the heat reflective film and the heat absorbing film may be disposed in an adhesive layer. As the functional film, a film such as a film having a design function or a film having a physical function can be used.

In the embodiments described above, a protective film may be disposed on the outdoor side of the first glass sheet and/or on the indoor side of the second glass sheet. Examples of films that can be employed as a protective film include a hard coat film, a self-repairing film, an ultraviolet light-shielding film, and an anti-reflective film (AR film).

In the embodiments described above, a heat absorbing film or a resin plate made from a material with which heat rays can be absorbed is used, but a film or resin plate with which a portion of incident light can be absorbed may be used. From the perspective of further improvement in the heat shielding performance, it is preferable to use a heat absorbing film or a resin plate made from a material that can absorb heat rays.

REFERENCE SIGNS LIST

1 Laminated glass
2 Resin plate
3 First adhesive layer
4 First glass sheet
5 Second adhesive layer
6 Second glass sheet
7 Heat reflective film
7*a* First substrate
7*b* Reflective film
8 Heat absorbing film (light absorbing member)
8*a* Second substrate
8*b* Absorbing film

The invention claimed is:
1. A laminated glass comprising:
a core material including a resin plate;
a first glass sheet disposed on one surface side of the core material via a first adhesive layer;
a second glass sheet disposed on another surface side of the core material via a second adhesive layer;
a heat reflective film disposed in the first adhesive layer; and
a light absorbing film disposed in the second adhesive layer,
wherein the first adhesive layer comprises a first portion provided between the first glass sheet and the heat reflective film, and a second portion provided between the heat reflective film and the core material, wherein the second adhesive layer comprises a first portion provided between the second glass sheet and the light absorbing film, and a second portion provided between the light absorbing film and the core material, wherein the heat reflective film is formed as a member separate from the first adhesive layer, wherein the light absorbing film is formed as a member separate from the second adhesive layer, wherein the heat reflective film comprises a first substrate and a reflective film formed on the first substrate, wherein the reflective film is disposed closer to the core material than the first substrate, wherein the light absorbing film comprises a second substrate and an absorbing film formed on the second substrate, and wherein the absorbing film is disposed closer to the core material than the second substrate.

2. The laminated glass according to claim 1, wherein the light absorbing film is a heat absorbing film.

3. The laminated glass according to claim 1, wherein a thickness of the first portion of the first adhesive layer between the heat reflective film and the first glass sheet is larger than a thickness of the second portion of the first adhesive layer between the heat reflective film and the core material.

4. The laminated glass according to claim 3, wherein the thickness of the first portion of the first adhesive layer between the heat reflective film and the first glass sheet is 0.3 mm or larger.

5. The laminated glass according to claim 1, wherein a thickness of the first portion of the second adhesive layer between the light absorbing film and the second glass sheet is larger than a thickness of the second portion of the second adhesive layer between the light absorbing film and the core material.

6. The laminated glass according to claim 5, wherein the thickness of the first portion of the second adhesive layer between the light absorbing film and the second glass sheet is 0.3 mm or larger.

* * * * *